United States Patent Office 3,554,950
Patented Jan. 12, 1971

3,554,950
WAX-POLYMER COMPOSITIONS
Richard W. Sauer, Cherry Hill, N.J., assignor to Atlantic Richfield Company, New York, N.Y., a corporation of Pennsylvania
No Drawing. Continuation of application Ser. No. 507,248, Nov. 10, 1965. This application Aug. 1, 1968, Ser. No. 751,688
Int. Cl. C08f 45/52; C09d 13/00; D21h 1/36
U.S. Cl. 260—28.5
7 Claims

ABSTRACT OF THE DISCLOSURE

This invention relates to wax compositions and to a method for producing a suitable dispersion in wax of insoluble polymer of the vinyl and vinylidene series which comprises polymerizing the monomers in situ in molten wax in the presence of a wax-soluble polymer having a molecular weight of at least 8,000. Preferably, the wax-insoluble polymer is a butadiene-styrene copolymer having from 50–85 weight percent bound styrene and the wax-soluble polymer is an ethylene/vinylacetate copolymer having from 5–50 weight percent bound vinyl acetate. The insoluble polymer may be incorporated into the wax in amounts ranging from 5–400 parts per 100 parts of wax.

---

This is a continuation of 507,248 filed Nov. 10, 1965 and now abandoned.

This invention relates to wax-polymer compositions. In another aspect, this invention relates to a method of preparing stable dispersions of polymers in wax.

It is a common practice in the art to incorporate soluble polymers into wax compositions in order to provide more strength. However, due to the presence of the soluble polymer, a substantial increase in the melt viscosity accompanies any improvement in the physical properties. At the higher polymer loadings, this increase is so great the compositions cannot be utilized in conventional coating equipment without expensive modification.

Numerous attempts have been made to improve the strength of wax compositions without causing an increase in the melt viscosity. For example, it has been reported that high strength wax compositions may be produced by incorporating a soluble hydrocarbon polymer and a small amount of polar polymer into molten wax and then subsequently cross-linking the resultant mixture with a free radical catalyst. While this method provides compositions having excellent physical strength, the melt viscosity is still adversely affected because substantially all of the polymer is either in solution or cross-linked. Therefore, in using a composition of this type, a diluent is required in order to lower the melt viscosity.

Previous attempts have been made to suspend insoluble polymers into wax to provide increased strength. However, it has not been possible to obtain a composition in which the insoluble polymer would remain dispersed in the wax. This problem has been avoided by compatibilizing the polymers through the use of solvents such as gums, artificial resins, and fatty acid phthalides. This approach, however, always results in an increase in melt viscosity which corresponds to the amount of polymer in solution.

It has now been found that insoluble polymers can be suspended or dispersed in wax with a small amount of a wax-soluble polymer. More specifically, it has been found that by polymerizing the monomer of an insoluble polymer in molten wax in the presence of a small amount of wax-soluble suspending polymer, a stable dispersion of insoluble polymer in wax is produced which has high physical strength and a low melt viscosity.

The compositions of this invention can be utilized in numerous wax applications which require low melt viscosity and high flexibility and elongation properties. For example, these compositions may be utilized in the pour or injection molding of articles such as crayons and candles or in hot melt coatings for paper or in caulking compounds or hot melt adhesives for laminating, etc.

Therefore, it is an object of this invention to provide wax-polymer-monomer compositions which can be polymerized to form stable dispersions of polymers in wax.

It is a further object of this invention to provide a method for incorporating insoluble polymers into wax to produce a composition in which the insoluble polymer remains dispersed in the wax.

Another object of this invention is to provide wax-polymer compositions having high strength and low melt viscosity.

The compositions of this invention comprise in parts by weight:

(a) 100 parts of wax,
(b) from 5 to 400 parts of a wax-insoluble polymer of vinyl or vinylidene monomers or mixtures thereof, said polymer being dispersed in the wax and
(c) a wax-soluble polymer having an average molecular weight greater than 8,000 and being soluble in the wax without the use of any additional solubilizing agents; said wax-soluble polymer being present in an amount sufficient to maintain the wax-insoluble polymer of part (b) as a stable dispersion in the wax.

These compositions are prepared by:

(a) admixing in 100 parts of molten wax:
   (1) from 5 to 400 parts of a monomer system, the polymer of which is insoluble in wax; comprising at least one monomer selected from the group consisting of vinyl and vinylidene monomers and mixtures thereof,
   (2) a wax-soluble polymer having an average molecular weight greater than 8,000 in an amount sufficient to maintain the insoluble polymer as a stable dispersion in wax,
(b) polymerizing the mixture of part (a) until the desired proportion of monomer has been converted to polymer and
(c) recovering the resulting stable dispersion of polymer in wax.

In order to obtain a stable composition in the practice of this invention, it is necessary to suspend the insoluble polymer in wax with a small amount of wax-soluble polymer. This suspending polymer must have a minimum solubility of about 1 weight percent in molten wax. This solubility must be inherent in the polymer itself without the use of outside aids such as solvents. The suspending polymers can be homopolymers or copolymers and are comprised mainly of carbon and hydrogen but they can have other functional groups incorporated in or pendant to the main polymer chain. The essence of operability of any particular polymer lies not in the specific chemical structure but rather it depends upon the degree of wax-solubility possessed by the polymer. Therefore, in suspending a certain ammount of a particular insoluble polymer different amounts of the various soluble polymers would be required. Examples of operable wax-soluble polymers include but are not limited to polyolefins such as polyethylene, polyisobutylene, polyhexene-1 and polydecene-1; polyvinyl ethers such as poly (methyl, ethyl or butyl vinyl ether), ethylene-vinyl acetate copolymers and styrene-butadiene copolymers having a minor amount of styrene. A particularly preferred suspending polymer is an ethylene-vinyl acetate copolymer having a bound vinyl acetate content ranging from 5 to 50 percent by weight. This particular copolymer has considerably higher suspending ability when compared with other wax-soluble polymers at the same loading.

The suspending polymer must have a molecular weight of at least 8,000 and preferably from 10,000 to 500,000. Polymers having higher molecular weights may be utilized if they possess the requisite wax solubility.

The suspending polymer must be present in an amount sufficient to suspend the insoluble polymer during and after polymerization. This minimum loading is dependent upon the type of suspending polymer and the type and amount of insoluble polymer. For most insoluble polymers, the soluble polymer loading must be in excess of 2 parts by weight per 100 parts by weight insoluble polymer. The maximum loading is determined by the solubility of the polymer. However, since the presence of soluble polymer is detrimental to the melt viscosity of the composition, the loading should not exceed the optimum amount necessary to provide a stable suspension. For most compositions, this loading will not exceed 30 parts by weight per 100 parts by weight insoluble polymer.

The wax component is not critical to the practice of this invention and both natural and synthetic waxes can be utilized. The wax, however, must have a melting point below the degradation temperature of the polymers which are to be incorporated. Examples of the types of wax which can be utilized include but are not limited to carnauba wax, beeswax, Japan wax, petroleum wax and synthetic waxes such as esters of fatty acids and higher alcohols. Various waxes can be combined provided each wax is compatible with the other waxes and the suspending polymer. A petroleum wax such as a paraffin wax or a microcrystalline wax or mixtures thereof is preferred. The paraffin waxes normally have a melting point ranging from 115° F. to 200° F. and the microcrystalline waxes normally have a melting point ranging from 140° F. to 200° F.

The wax-insoluble polymers which can be utilized in the practice of this invention are selected from a general class which includes vinyl and vinylidene polymers. This class includes all wax-insoluble polymers which have been polymerized through a monovalent or bivalent ethylene radical. Included in this class but not limited thereto are polymers such as polystyrene, polybutadiene, polyvinyl chloride, polyvinylidene chloride, polyacrylates, polymethacrylates and polyvinyl esters. These wax-insoluble polymers hereinafter referred to as dispersed polymers can be either homopolymers or copolymers having a solubility in molten wax of less than 0.5 weight percent. Wax compositions having the optimum properties are produced when the dispersed polymer has an average molecular weight in excess of 10,000 and preferably in excess of 50,000. A particularly preferred dispersed polymer is formed by polymerizing in situ a mixture of butadiene and styrene monomers under conditions which yield a copolymer having from about 50 to 85 weight percent bound styrene.

It has been found that stable dispersions containing up to 98 weight percent dispersed polymer may be prepared. However, the preferred compositions which retain waxlike characteristics have from 5 to 400 parts by weight dispersed polymer per 100 parts by weight wax. Compositions containing from 25 to 150 parts dispersed polymer per 100 parts by weight wax are most preferred.

In order to prepare a stable dispersion, the dispersed polymer must be formed in situ in the molten wax in the presence of the suspending polymer. In general, the polymerization conditions which can be utilized correspond to those which are normally utilized in the solution polymerization of the particular monomer. For example, the suspending polymer and monomers can be added to molten wax and allowed to polymerize until the desired proportion of monomer has been converted to polymer.

It is recognized that many different polymerization techniques can be utilized in the practice of this invention without departing from the scope thereof. For example, agitation may be utilized during polymerization. The monomers, catalysts and suspending polymer can be added incrementally throughout the polymerization stage. Incremental addition of monomers can be made upon the combined monomer charge or upon any of the particular monomers alone. During the polymerization, it is only necessary that a sufficient amount of soluble polymer be present to suspend the quantity of polymer which has been formed. Therefore, incremental additions of soluble polymer can be made so long as the minimum concentration necessary for a stable suspension is always maintained. Catalyst, chain terminators, lubricants, stabilizers and other polymerization additives can be added at the start of or at any time during polymerization.

The polymerization can be initiated utilizing heat alone or preferably through the use of free radical catalysts such as peroxides, ultraviolet light, and azobisisobutyronitrile, Preferably, peroxides such as benzoyl, lauroyl, dibasic acid, cyclohexanone, methyl ethyl ketone peroxides and cumene hydroperoxide are utilized. The polymerization temperature must be above the melt temperature of the wax but below the degradation temperature of any of the components. For most wax-polymer mixtures, this temperature ranges from 100° F. to 400° F. and preferably from 100° F. to 200° F. Autogeneous, sub or super atmospheric pressures can be utilized. Polymerization is continued for a time sufficient to convert the desired amount of monomer to polymer. When this conversion is reached, the molten mixture is stripped to remove unreacted monomers and cooled to form a stable dispersion of insoluble polymer in wax.

It should be understood that other wax additives normally incorporated into wax or polymers in order to retain or improve the basic properties can be incorporated into the compositions of this invention in functional amounts without departing from the scope of this invention. Common additives include but are not limited to pigments, viscosity improvers, plasticizers, ultraviolet light or heat stabilizers, anti-blocking and gloss agents.

In order that those skilled in the art may better understand the practice of this invention, the following examples are given by way of illustration and are not meant to be a limitation on the scope of this invention. All parts are by weight.

EXAMPLE I

In accordance with the amounts set forth in Table I, an ethylene-vinyl acetate copolymer (EVA) was dissolved in molten wax with agitation. Between .02 and .2 part of benzoyl peroxide were added to the wax-copolymer mixtures. The mixtures were then cooled until they had solidified, in order to facilitate the addition of monomers. Styrene and butadiene monomers were then added at the ratio set forth in Table I. The total monomer loadings were approximately 50 percent by weight in excess of the amounts of dispersed polymer set forth in Table I. The systems were then purged with nitrogen, sealed and agitated for 16 hours at temperatures which were above the melting points of the waxes and ranged from 70° C. to 80° C. At the end of the polymerization cycle, the unreacted monomers were steam stripped from the compositions. Monomer to polymer conversions averaged about 50 percent. The properties of the compositions are set forth in Table I.

polymer. It is further demonstrated that compositions having high elongation properties, good tensile strength and a lower melt viscosity may be produced by replacing some of the soluble polymers in the compositions with insoluble polymers. In this regard, it should be noted that a composition having a high loading of insoluble polymer has considerably lower melt viscosity (higher melt index) than a composition containing a similar loading of soluble polymer. Compare Formulation Nos. 2 and 4 with 5 and Formulation Nos. 7 and 9 with 11.

EXAMPLE II

In accordance with the amounts set forth in Table II, suspending polymers were dissolved in molten wax with TABLE I
[Parts by Weight]

| Formulation Number | Wax | Wax-soluble suspension polymer [1] | Wax-insoluble dispersed polymer [2] | Weight ratio of styrene/butadiene monomers charged | Modified melt index, g./10 min.[8] | Tensile strength, p.s.i. | Percent elongation |
|---|---|---|---|---|---|---|---|
| 1 | [3] 100 | 0 | 32.3 | 75/25 | ([4])+ | ([4]) | ([4]) |
| 2 | 100 | 12.6 | 32.3 | 75/25 | 2302 | 151 | 158 |
| 3 | 100 | 0 | 54.6 | 75/25 | ([4]) | ([4]) | ([4]) |
| 4 | 100 | 15 | 54.6 | 75/25 | 570 | 157 | 357 |
| 5 | 100 | 33.4 | 0 | | 441 | 183 | 52 |
| 6 | [5] 100 | 0 | 32.3 | 75/25 | ([4]) | ([4]) | ([4]) |
| 7 | 100 | 14.7 | 32.3 | 75/25 | 942 | 406 | 24 |
| 8 | 100 | 0 | 63.6 | 75/25 | ([4]) | ([4]) | ([4]) |
| 9 | 100 | 15.0 | 63.6 | 75/25 | 324 | 403 | 190 |
| 10 | 100 | 25.0 | 0 | | 660 | 581 | 18 |
| 11 | 100 | 42.8 | 0 | | 112 | 992 | 30 |
| 12 | 100 | 0 | 58.3 | 70/30 | ([4]) | ([4]) | ([4]) |
| 13 | 100 | 11.2 | 58.3 | 70/30 | 250 | 349 | 85 |
| 14 | 100 | 0 | 38.1 | 60/40 | ([4]) | ([4]) | ([4]) |
| 15 | 100 | 11.2 | 38.1 | 60/40 | 810 | 303 | 11 |
| 16 | [6] 100 | 0 | 41.3 | 75/25 | ([4]) | ([4]) | ([4]) |
| 17 | 100 | 15.0 | 41.3 | 75/25 | 109 | 193 | 54 |
| 18 | [7] 100 | 0 | 47.6 | 75/25 | ([4]) | ([4]) | ([4]) |
| 19 | 100 | 15.0 | 47.6 | 75/25 | 546 | 182 | 181 |

[1] An ethylene-vinyl acetate copolymer having an average molecular weight in excess of 100,000 and a bound vinyl acetate content of 50 wt. percent.
[2] Styrene-butadiene copolymers having bound styrene/bound butadiene ratios approximately equal to the monomer ratio charged.
[3] The wax in Formulation Nos. 1 through 5 was a blend having a melting point ranging from 125° F. to 140° F. and containing about 85 wt. percent paraffin wax and about 15 wt. percent microcrystalline wax.
[4] The mixture separated into a polymer/wax two phase system.
[5] The wax in Formulation Nos. 6 through 15 was a highly refined paraffin wax containing approximately 90 percent normal paraffins and having a melting point ranging from 145° F. to 155° F.
[6] The wax in Formulations 16 and 17 was a microcrystalline wax having a melting point ranging from 170° to 175° F. The polymerization temperature was 80° C.
[7] The wax in Formulations 18 and 19 was a highly refined paraffin wax containing approximately 75 percent normal paraffins and having a melt point of approximately 129° F.
[8] ASTM D1238-57T test run on a 325 g. load at 95° C. A higher melt index represents a lower melt viscosity By comparing the results set forth in Table I, it is apparent that stable dispersions result only when the monomer is polymerized in the presence of a suspension agitation. Benzoyl peroxide was added to these wax-polymer mixtures. The mixtures were then cooled until they had solidified. Monomers were then added in accordance with the amounts set forth in Table II. The systems were then purged with nitrogen, sealed, and agitated at the specified temperatures throughout the polymerization cycle. At the end of this cycle the unreacted monomers were steam stripped from the compositions. The stability of the compositions is set forth in Table II.

lar weight greater than 8,000 and having from 5 to 50 weight percent bound vinyl acetate.

3. A composition according to claim 1 wherein the wax-soluble polymer is present in an amount in excess of 2 parts per 100 parts of wax-insoluble polymer.

TABLE II

| | Formulation Number | | | | | | | | |
|---|---|---|---|---|---|---|---|---|---|
| | 20 | 21 | 22 | 23 | 24 | 25 | 26 | 27 | 28 |
| Wax [1] | 100 | 100 | 100 | 100 | 100 | 100 | 100 | 100 | 100 |
| Suspending polymer: | | | | | | | | | |
| Polyhexene-1 [2] | 5.2 | | | | | | | | |
| Polyisobutylene | | 15 | 15 | 15 | | | | | |
| Molecular weight | | 80,000 | 10,000 | 2,500 | | | | | |
| Polyethylene [3] | | | | | 11.1 | | | | |
| Ethylene-vinyl acetate [4] | | | | | | 1.7 | .17 | 12.5 | 12.5 |
| Monomer charged: | | | | | | | | | |
| Methyl methacrylate | 5.3 | | | | | | | | |
| Styrene | | 40.2 | 40.2 | 40.2 | 100 | 93.5 | 93.5 | 62.5 | 32.9 |
| Butadiene | | 13.5 | 13.5 | 13.5 | 41.6 | 31.3 | 31.3 | | 14.2 |
| Triethyleneglycoldimethylacrylate | | | | | | | | | 8.3 |
| Resulting composition: | | | | | | | | | |
| Wax | | 100 | 100 | | 100 | 100 | | 100 | |
| Suspending polymer | | 15.1 | 15.0 | | 11.0 | 1.7 | | 12.6 | |
| Dispersed polymer | | 43.7 | 46.3 | | 52.1 | 39.2 | | 30.4 | |
| Properties [5] | S | S | S | U | S | S | U | S | S |
| Polymerization conditions: | | | | | | | | | |
| Benzoyl peroxide | .22 | .25 | .25 | .25 | .51 | .45 | .45 | .38 | .31 |
| Polymerization temp., °C | 70 | 82 | 82 | 82 | 93 | 80 | 80 | 80 | 80 |
| Polymerization time, hrs | 16 | 19 | 19 | 19 | 17 | 18 | 18 | 18 | 18 |

[1] A highly refined paraffin wax having a melting point ranging from 135° to 137° F. and containing about 95 percent normal paraffins.
[2] Average molecular weight, greater than 100,000.
[3] Low density polyethylene having an average molecular weight of 23,000.
[4] As defined in Table I, note 1.
[5] S=Stable dispersion resulted; U=Unstable, the mixture separated into a polymer/wax two phase system.

The formulations described in Table II demonstrate various types of suspending polymers which can be utilized and various monomer systems which can be polymerized in situ.

I claim:

1. A composition comprising in parts by weight:
   (a) 100 parts of wax,
   (b) from 5 to 400 parts of a wax-insoluble styrene-butadiene polymer having an average molecular weight in excess of 10,000 and having from 50 to 85 weight percent bound styrene, said polymer being prepared by the in situ polymerization of the corresponding monomers in the wax while in a molten state in the presence of the wax-soluble polymer of part (c),
   (c) a wax-soluble polymer having an average molecular weight greater than 8,000 selected from the group consisting of polyethylene, polyisobutylene, and polyhexene-1, polydecene-1, polyvinyl methyl ether, polyvinyl ethyl ether, polyvinyl butyl ether, ethylene-vinyl acetate copolymers having from 5 to 50 weight percent bound vinyl acetate and styrene-butadiene copolymers having a minor amount of bound styrene, said wax-soluble polymer being present in an amount sufficient to maintain the wax-insoluble polymer of part (b) as a stable dispersion in wax.

2. A composition according to claim 1 comprising in parts by weight:
   (a) 100 parts of a petroleum wax,
   (b) from 5 to 400 parts of a wax-insoluble styrene-butadiene copolymer having an average molecular weight in excess of 10,000 and having from 50 to 85 weight percent bound styrene, said styrene-butadiene copolymer being prepared by the in situ polymerization of the respective monomers in the wax while in a molten state in the presence of the wax-soluble polymer of part (c),
   (c) from 2 to 30 parts of a wax-soluble ethylene-vinyl acetate copolymer having an average molecu- 4. A composition in accordance with claim 1 wherein the wax is a petroleum wax.

5. A process for producing a wax-polymer composition comprising:
   (a) admixing in 100 parts of molten wax:
      (1) from 5 to 400 parts of a monomer system the polymer of which is insoluble in wax and selected from the group consisting of poly-styrene, polybutadiene, styrene-butadiene copolymers having 50 to 85 weight percent bound styrene, polyvinyl chloride, and polyvinyl esters,
      (2) a wax-soluble polymer having an averave molecular weight greater than 8,000 selected from the group consisting of polyethylene, polyisobutylene, polyhexene-1, polydecene-1, polyvinyl methyl ether, polyvinyl ethyl ether, polyvinyl butyl ether, ethylene-vinyl acetate copolymers, having from 5 to 50 weight percent bound vinyl acetate, and styrene-butadiene copolymers having a minor amount of bound styrene, said wax-soluble polymer being present in an amount sufficient to maintain the wax-insoluble polymer of part (1) as a stable dispersion in wax,
   (b) polymerizing the mixture of part (a) until the monomer has been converted to polymer having a molecular weight in excess of 10,000, and
   (c) recovering and resulting stable dispersion of polymer in wax.

6. A process according to claim 5 wherein the polymerization is initiated by a free radical catalyst.

7. A process according to claim 5 comprising:
   (a) dissolving in 100 parts molten petroleum wax from 2 to 30 parts of an ethylene-vinyl acetate copolymer having an average molecular weight greater than 100,000 and a bound vinyl acetate content from 5 to 50 percent by weight,
   (b) adding from .02 to .2 part of benzoyl peroxide to the mixture of part (a), (c) adding to the mixture of part (b) from 25 to 150 parts of a monomer system having from 50 to 85 weight percent styrene and from 15 to 50 weight percent butadiene,
(d) polymerizing for a time sufficient to convert the desired amount of monomer to polymer,
(e) stripping the unreacted monomers from the molten polymerized mixture, and
(f) cooling the molten polymerized mixture to form a stable dispersion of polymers in wax.

References Cited

UNITED STATES PATENTS

| | | | |
|---|---|---|---|
| 2,723,468 | 11/1955 | Marcy | 260—28.5 |
| 3,171,825 | 3/1965 | Mark | 260—28.5A |
| 3,245,931 | 4/1966 | Matthew | 260—28.5 |
| 3,306,882 | 2/1967 | Pullen | 260—28.5A |

OTHER REFERENCES

Zimmerman and Lavine, "Handbook of Material Trade Names," Industrial Research Service, 1953, pp. 443–444.

MORRIS LIEBMAN, Primary Examiner

P. R. MICHL, Assistant Examiner

U.S. Cl. X.R.

106—19; 117—155, 158